United States Patent [19]

Hicks et al.

[11] 4,161,160

[45] Jul. 17, 1979

[54] FUEL ADDITIVE INJECTION SYSTEM FOR DIESEL ENGINES

[75] Inventors: George E. Hicks; John W. Litherland, both of Peoria; Arlan G. Martin, Morton; Lawrence Williams, Peoria Heights, all of Ill.

[73] Assignee: Caterpillar Tractor Co., Peoria, Ill.

[21] Appl. No.: 847,530

[22] Filed: Oct. 31, 1977

[51] Int. Cl.² ............................................. F02M 43/00
[52] U.S. Cl. .................................. 123/1 A; 123/25 B; 123/139 ST; 123/179 L; 123/180 R; 123/198 A
[58] Field of Search .............. 123/1 A, 198 A, 180 R, 123/180 T, 30 B, 139 ST, 179 L, 180 AC, 127, 119 ED, 136, 25 B

[56] References Cited

U.S. PATENT DOCUMENTS

| | | | |
|---|---|---|---|
| 1,015,482 | 1/1912 | Ducker | 123/180 R |
| 2,958,317 | 11/1960 | McNally | 123/119 ED |
| 3,354,872 | 11/1967 | Gratzmuller | 123/136 |
| 3,807,377 | 4/1974 | Hirschler et al. | 123/136 |
| 3,812,830 | 5/1974 | Traisnel | 123/180 R |
| 3,960,131 | 6/1976 | Davis | 123/180 R |
| 3,996,902 | 12/1976 | Ri et al. | 123/25 B |
| 4,011,840 | 3/1977 | Foster | 123/1 A |
| 4,031,864 | 6/1977 | Crothers | 123/136 |

Primary Examiner—Ira S. Lazarus
Attorney, Agent, or Firm—Wegner, Stellman, McCord, Wiles & Wood

[57] ABSTRACT

A diesel fuel supply system for use with a diesel engine including a fuel pump for supplying fuel to the engine, a fuel tank connected to the pump for delivering fuel to the pump, a fuel additive tank, a valve, conduits connecting the additive tank to the pump through the valve in parallel to the fuel tank, and an operator for selectively operating the valve.

7 Claims, 1 Drawing Figure

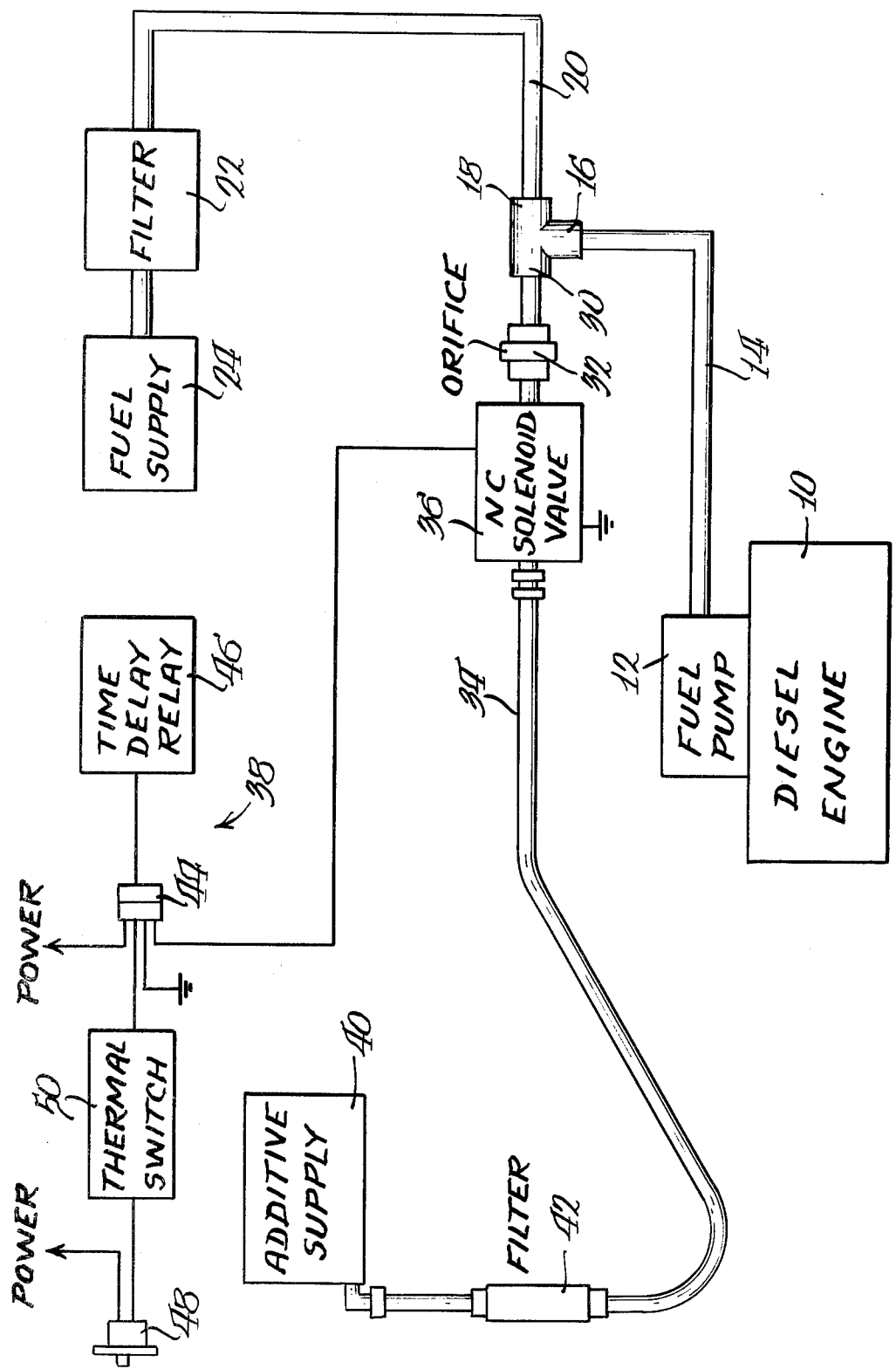

FUEL ADDITIVE INJECTION SYSTEM FOR DIESEL ENGINES

BACKGROUND OF THE INVENTION

This invention relates to fuel supply systems for diesel engines and, more particularly, to such systems provided with a fuel additive injector.

Diesel fuels are typically rated by cetane numbers, and a given diesel engine, when fully warmed up, will operate quite satisfactorily on a fuel having a given cetane number. However, when cold, and operating on fuel of a given cetane number, many engines will emit excessive quantities of so-called "white smoke" until the engine has fully warmed up. The emission of such white smoke is highly undesirable in terms of pollution problems. In order to overcome the problem, the prior art has resorted to the mixing of fuel additives which are cetane number increasers with the fuel in the main fuel tank, the amount of such additive being determined by the necessary increase of the cetane number required to avoid undesirable white smoke emission levels.

This approach, while quite successful in terms of the ultimate result of the reduction of white smoke emission, is economically prohibitive since the additives are costly and continue to be consumed even when not required after the engine is warmed up due to their presence in the main fuel tank.

SUMMARY OF THE INVENTION

The present invention is directed to overcoming one or more of the above problems.

According to the present invention, there is provided a diesel fuel supply system for use with diesel engines including a fuel pump for supplying fuel to the diesel engine. A fuel tank is connected to the pump for delivering fuel to the pump and there is further provided an additional, fuel additive tank for containing an additive which will increase the cetane number of the fuel. A valve is also provided and means interconnect the additive tank to the fuel pump through the valve in parallel relation to the fuel tank. Means are provided for selectively operating the valve to allow the fuel additive to flow to the fuel pump only when the fuel additive is needed to increase the cetane number of the fuel.

Other objects and advantages will become apparent from the following specification taken in connection with the accompanying drawing.

DESCRIPTION OF THE DRAWING

The FIGURE is a somewhat schematic, block diagram of an internal combustion diesel engine employing a fuel supply system made according to the invention.

DESCRIPTION OF THE PREFERRED EMBODIMENT

An exemplary embodiment of a diesel fuel supply system made according to the invention is illustrated in the FIGURE in connection with a diesel engine shown schematically at 10. The engine 10 is provided with a fuel pump 12 which may be of conventional construction for delivering fuel to the cylinders of the engine 10. The fuel pump 12 receives fuel via a first conduit 14 which may be either separate from the pump 12 as shown, or integral therewith and which is connected to a tee 16. One branch 18 of the tee 16 is connected via a second conduit 20 through a filter 22 to the main fuel supply tank 24. The tank 24 is adapted to receive, from any suitable source, diesel fuel having a cetane number sufficient to allow the engine 10 to operate, when warm, at a desired performance level with some predetermined desired minimum of emissions.

The other branch 30 of the tee 16 is connected to a fluid flow metering means 32 in a third conduit 34. In a preferred form of the invention, the metering means 32 is in the form of an orifice which, for the usual engine, may have an orifice diameter of approximately 0.030 inches. However, it is to be understood that the dimension may change depending upon the size of the engine with which the supply system is used as well as the type of fuel additive employed dependent upon the ability of a given quantity of the additive to produce a particular increase in cetane level at a particular rate of blend with the conventional fuel.

A normally closed solenoid operated valve 36 is connected in the conduit 34 in series with the orifice 32 and a control circuit, generally designated 38, is provided for the valve 36.

A fuel additive tank 40 which will normally have a capacity of but one or two gallons, is connected to the third conduit 34 via a filter 42. Thus, it will be appreciated that when the solenoid valve 36 is opened, a fuel additive from the tank 40 will flow to the tee 16 to be mixed with the conventional fuel, the amount of such flow being metered by the orifice 32 and somewhat depending upon the vertical position of the tank 40 with respect to the orifice and the amount of negative pressure induced in the conduit 14 by the fuel pump 12 during operation of the same.

The valve 36 may be energized to be opened through a set of contacts shown schematically at 44 and operated by a time delay relay 46 of conventional construction. Preferably, the time delay relay 46 has a period on the order of about two minutes, although, depending upon the warmup characteristics of the engine 10, greater or lesser periods can be utilized.

A manually operated switch 48 is connected to the time delay relay and, when momentarily closed, will energize the time delay relay 46 to in turn energize and open the valve 36. Even though the switch 48 will be closed only momentarily by an operator, the time delay relay 46 will continue to maintain the valve 36 open for the full length of period, normally two minutes, as mentioned previously. At that time, the time delay relay 46 will cut off the supply of electrical power to the valve 36 and allow the same to close.

The time period utilized is, as mentioned, dependent upon the warmup characteristics of the engine 10 and is chosen so that the fuel additive responsible for increasing the cetane number of the fuel delivered to the pump 12 will be delivered only for so long as is necessary for the engine 10 to warm up sufficiently that undesirable white smoke emissions will not occur.

Typically, the switch 48 will be a switch separate from any others used in the control of the engine although, in some cases, it could be mechanically coupled to the starter switch. In the case of the former, if an engine is still warm when being restarted, the switch 48 need not be actuated, with the result that there will be no unnecessary use of the fuel additive contained in the tank 40.

In the case of the latter, startup of the engine will always result in the delivery of the cetane number increasing additive to ensure that a forgetful operator cannot start the engine without the use of the fuel additive to positively ensure that there will be no undesirable emissions. However, when the switch 48 is coupled to the starter, there may be unnecessary use of the additive if the engine 10 is already warm.

If desired, the attributes of both systems and the disadvantages of neither can be obtained through the use of a thermal switch 50 interposed in the electrical circuit, normally between the switch 48 and the time delay relay 46. The thermal switch 50 will be associated with the engine 10 to sense the temperature thereof and will close only when the engine temperature is sufficiently low that undesirable white smoke emissions could occur. At all other times, when the engine is sufficiently warm such that such emissions cannot occur, the switch 50 will be opened, thereby preventing energization of the time delay relay 46 and the resultant opening of the valve 36.

From the foregoing, it will be appreciated that a fuel supply system for a diesel engine made according to the invention makes it possible to avoid undesirable levels of white smoke emissions during the startup of a cold diesel engine and yet eliminate unnecessary use of expensive cetane number improving additives.

The embodiments of the invention in which an exclusive property or privilege is claimed are defined as follows:

1. In a diesel fuel supply system, the combination of:
    a fuel pump for supplying fuel to a diesel engine;
    a fuel tank connected to said pump for delivering fuel to the pump;
    a fuel additive tank;
    a valve;
    means connecting said additive tank to said pump through said valve in parallel relation to said fuel tank; and
    means for selectively operating said valve.

2. The diesel fuel supply system of claim 1 wherein said valve is a solenoid operated valve and said operating means comprises a switch and a time delay relay connected in circuit with said valve for causing fluid communication between said pump and said additive tank for a predetermined period after actuation of said switch.

3. A diesel power unit including the diesel fuel supply system of claim 2 and further including a diesel engine connected to said fuel pump to receive fuel therefrom.

4. The diesel fuel supply system of claim 1 further including a fluid flow metering means interposed between said additive tank and said pump.

5. A diesel fuel supply system for use with diesel engines comprising:
    a fuel pump adapted to be connected to a diesel engine to supply fuel thereto;
    a first conduit connected to said fuel pump;
    a tee connected to said first conduit;
    a fuel tank;
    a second conduit interconnecting said tee and said fuel tank;
    a fuel additive tank;
    a normally closed, solenoid operated valve;
    a fluid metering orifice;
    a third conduit connecting said additive tank, said valve and said orifice in series to said tee; and
    an electrical control circuit for said valve.

6. The diesel fuel supply system of claim 5 wherein said control circuit includes an electrical actuator and time delay means responsive thereto for energizing said valve for a predetermined time.

7. The diesel fuel supply system of claim 6 wherein said time delay means comprises a time delay relay and further including filters in said second and third conduits.

* * * * *